April 18, 1950  J. C. MALEN  2,504,139
AUTOMATIC PILOT

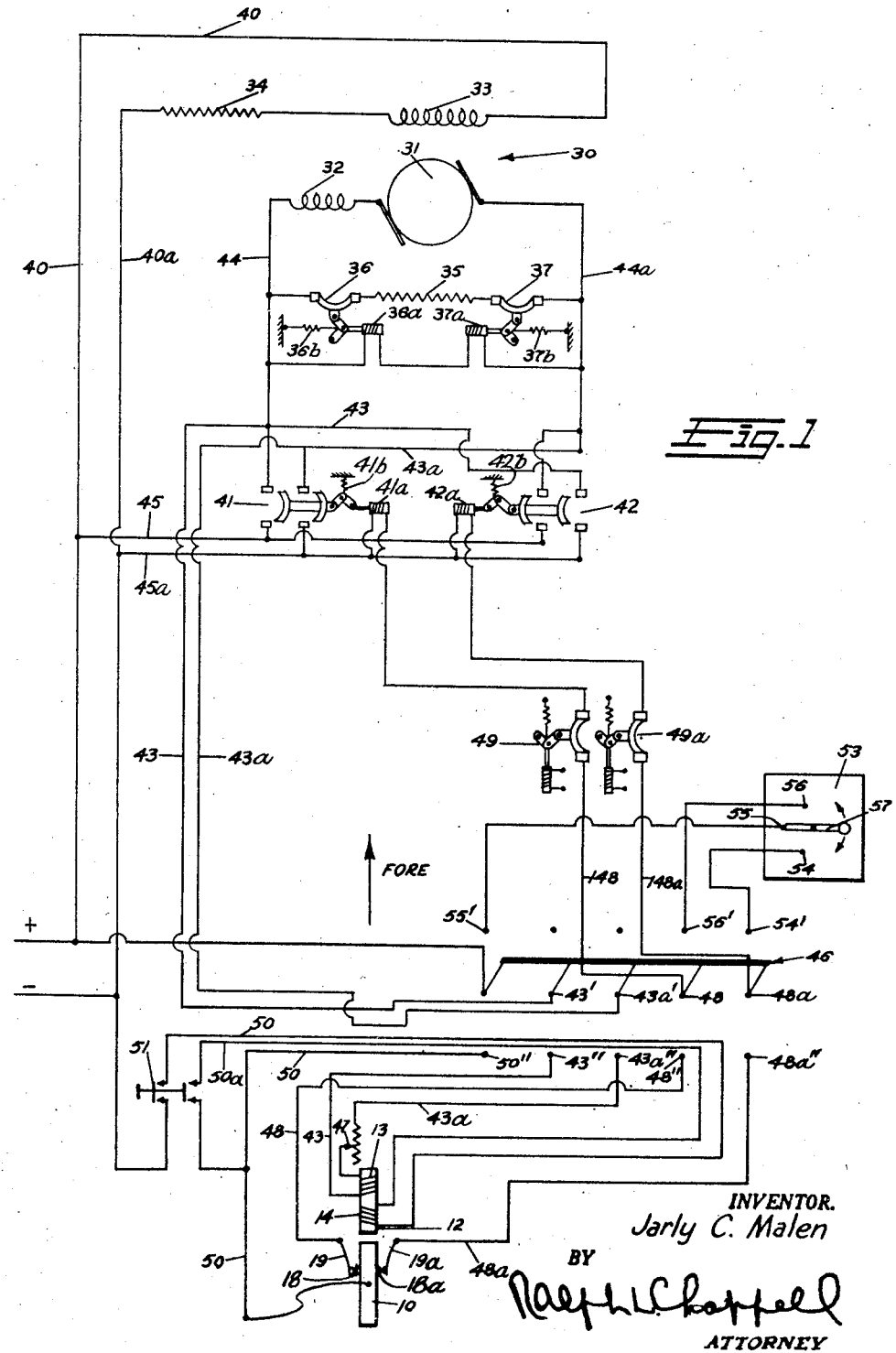

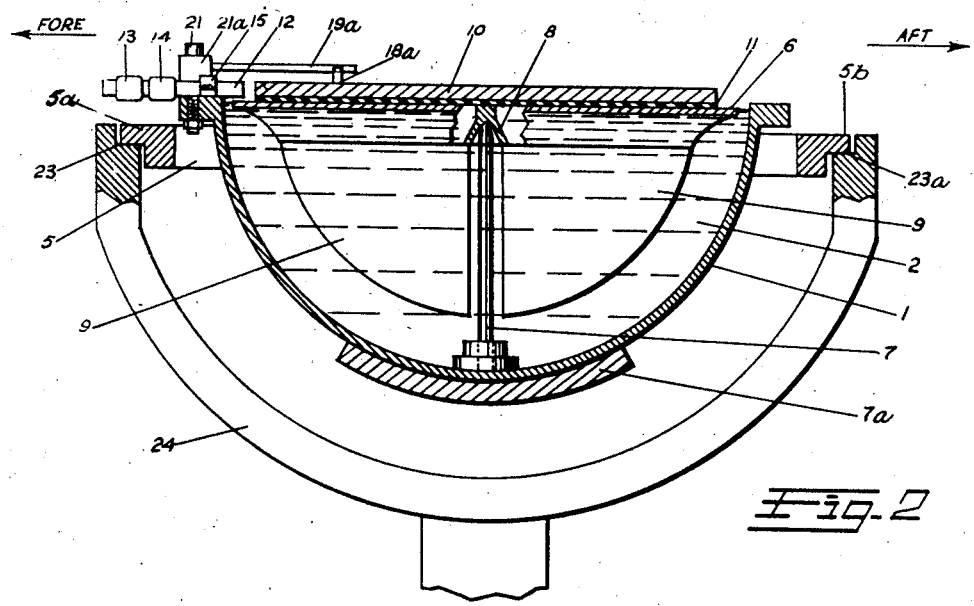
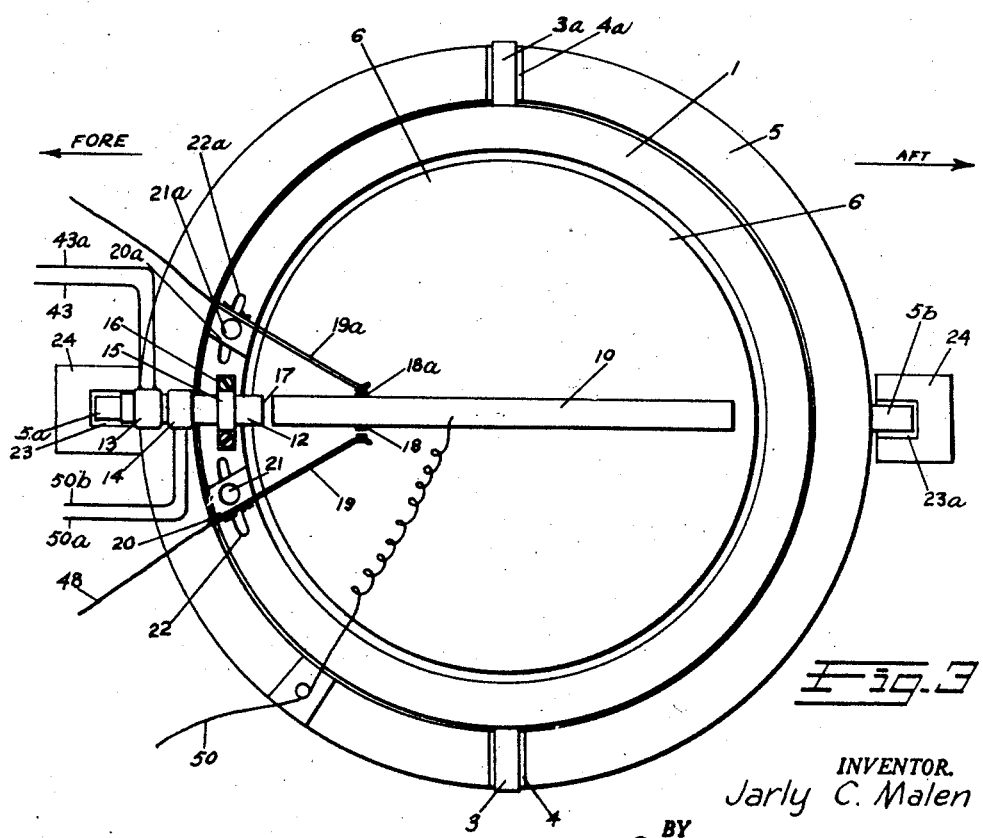

Filed June 30, 1945  3 Sheets-Sheet 3

INVENTOR.
Jarly C. Malen
BY
Ralph L. Chappell
ATTORNEY

Patented Apr. 18, 1950

2,504,139

UNITED STATES PATENT OFFICE 2,504,139

AUTOMATIC PILOT

Jarly C. Malen, United States Navy

Application June 30, 1945, Serial No. 602,638

7 Claims. (Cl. 244—77)

(Granted under the act of March 3, 1883, as amended April 30, 1928; 370 O. G. 757)

This invention relates to automatic pilot systems of automatically maintaining a ship or aircraft on a steady course.

One object of this invention is to provide a simple and inexpensive mechanism for attachment to the steering mechanism of a ship or aircraft which will be automatically responsive to course changes and which will automatically actuate the steering mechanism to compensate for such course change.

Another object is to provide an inertia type of automatic pilot.

Still another object is to provide an automatic pilot that is responsive to changes in course and elevation when installed in an aircraft.

Figure 4:
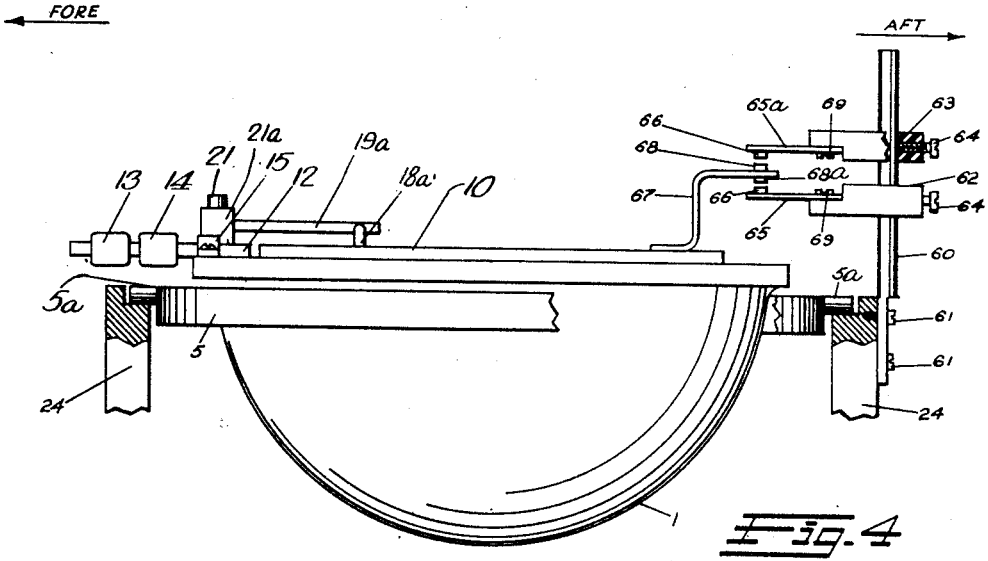
Figure 5:
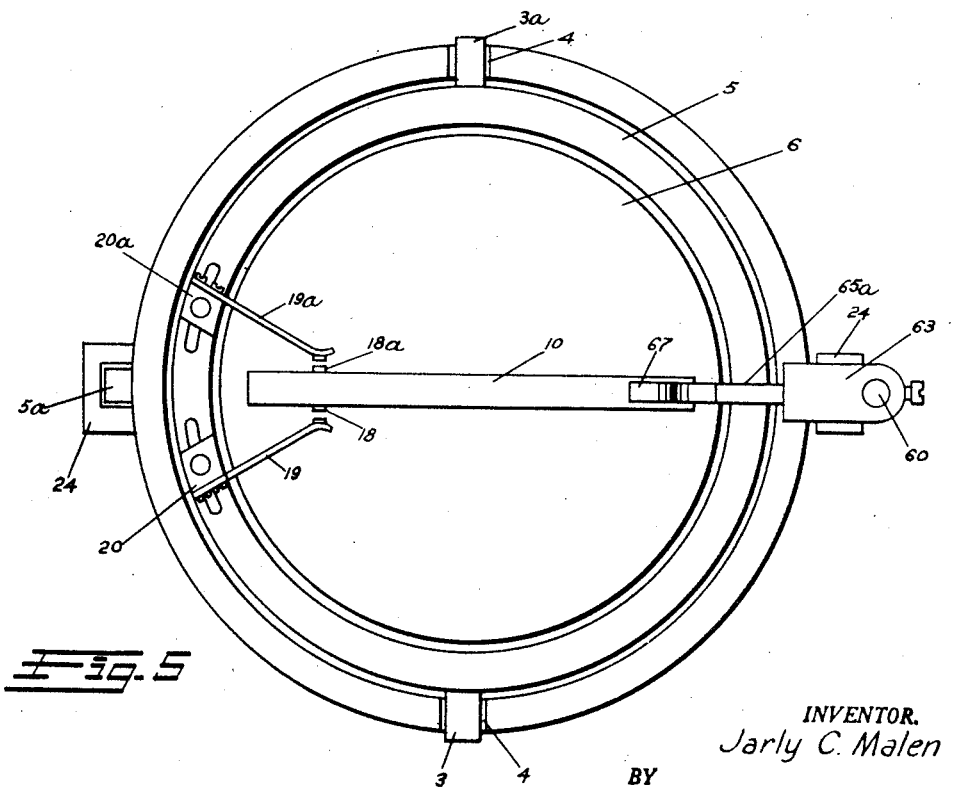

Further objects and advantages of this invention as well as its construction, arrangement and operation will be apparent from the following description and claims in connection with the accompanying drawings, in which, Figure 1 is a diagrammatic illustration of the automatic pilot system according to this invention and as applied to a standard electrically operated steering mechanism, Fig. 2 is a side elevational view partly in section showing the automatic pilot mechanism, Fig. 3 is a plan view of the pilot mechanism shown in Fig. 2, Fig. 4 is a side elevation partly in section of a modified type of automatic pilot adapted for use in an aircraft, and Fig. 5 is a plan view of the structure shown in Fig. 4.

There is shown, in Figs. 2 and 3, the structure of the automatic pilot steering-control means constructed according to this invention. The control means comprises a bowl 1 filled with a suitable flotation liquid 2. A pair of diametrically opposed knife edges 3—3a project outwardly from the periphery of the bowl 1 as shown in Fig. 3, and seat in a pair of corresponding bearings 4—4a provided in the gimbal ring 5. A buoyant circular float 6 is floatably supported in the bowl 1 by the liquid 2, and a centering pivot member 7 secured to the bottom of the bowl 1 and engaging pivot bearing 8 in float 6 positions the buoyant float 6 centrally within the bowl 1. A plurality of radially disposed webs or fins 9 are secured to the bottom of float 6 and extend downwardly therefrom into the fluid 2. These webs or fins serve to stabilize the float 6 against rotation in the floatation medium 2. The inside of the bowl 1 is highly polished to minimize friction between the liquid 2 and the bowl so that, as the bowl 1 rotates with the ship or plane on which is is mounted, the float 6 and the liquid 2 will remain stationary. A weight 7a is secured to the bottom of the bowl 1 to increase its stability.

A control bar 10 (Figs. 2 and 3) made of soft iron or other permeable, low-magnetic-retentivity conducting material is mounted diametrically across the surface of the float 6 and is electrically insulated therefrom by an insulating strip 11 (Fig. 2). An electromagnet comprising an iron core 12 and a pair of separate energizing coils 13 and 14 is secured, as by clamp 15 and screws 16, to the periphery of the bowl 1, with the core 12 normally in alignment with the bar 10, as shown in Fig. 3. The clamp 15 permits adjustment of the air gap 17 between the solenoid core 12 and the end of the control bar 10. A pair of electrical contacts 18—18a are mounted on opposite sides of the control bar as shown in Fig. 3.

Mounted on the periphery of the bowl 1 are a pair of electrical conducting arms 19—19a. The free ends of each of these arms extend into proximity to each of the electrical contact points 18—18a on the bar 10 as shown in Fig. 3. The arms 19—19a are mounted on insulating blocks 20—20a which are each secured to the periphery of bowl 1 by clamping bolts 21—21a mounted in elongate slots 22—22a formed in the peripheral face of the bowl. The bolt and slot connection enables adjustment of the arms 19—19a in relation to the control bar 10.

The gimbal ring 5 is provided with a pair of diametrically opposed knife edges 5a—5b (Figs. 2 and 3) arranged at right angles with respect to the knife edges 3—3a on the bowl 1 as shown in Fig. 3. The knife edges 5a—5b are mounted in bearings 23—23a on the supporting stand 24, which, in turn, is secured on the fore and aft line of the ship or plane. From the above description it can be seen that the bowl 1 is freely suspended in the support 24 so that it will remain substantially horizontal despite pitching, rolling or yawning of the ship or plane in which the support is mounted. The bowl 1 is free to rotate relative to the float 6 within limits because of the practically frictionless floatation medium 2, so that rotation of the bowl 1 (as the ship or plane is turned) will not affect the stability of the float 6.

There is shown in Fig. 1 a standard type of electrical steering control mechanism and electrical circuit connecting the steering control with the pilot device comprising this invention. The steering mechanism comprises a compound-wound motor 30 consisting of an armature 31, a series field 32, a shunt field 33, and a series resistance 34. The motor 30 is adapted to be run either as a motor to operate the steering mechanism (not shown) or as a generator in order to insure rapid braking of the motor when it is disconnected from the power source.

The armature 31 of motor 30 is normally connected across load resistor 35 by means of a pair of solenoid operated switches 36—37 which are normally held closed by the springs 36b—37b respectively. When the armature 31 is energized from the supply mains, as will later be described, the current through the solenoid coils 36a and 37a will open switches 36—37, disconnecting the armature from load resistor 35. When the power source is disconnected, coils 36a and 37a of switches 36—37 are deenergized and these switches will close under the action of springs 36b—37b, thus causing the armature 31 to be loaded by the load resistor 35.

The armature 31 of the steering motor 30 is connectable to the supply main by either one of a pair of double-pole solenoid operated switches 41 or 42. The armature 31 is connected in parallel to opposite poles of these switches by leads 44 and 44a as shown in Fig. 1, and the switches are, in turn, connected by leads 45 and 45a to the current supply main. It can therefore be seen that closing either one of the solenoid switches 41 or 42 will connect the armature 31 across the supply main (in parallel with the shunt field 33) and that the direction of rotation of the armature 31 will depend on which of these switches 41 or 42 is closed. The armature 31 is also connected by leads 43—43a to corresponding poles 43'—43a' of the five-pole double-throw switch 46. Two corresponding terminals 43" and 43a" of the switch 46 are, in turn, connected to solenoid coil 13 of the electromagnet 12 on the pilot, in series with a variable resistance 47.

The electrical conducting arms 19—19a are connected by leads 48—48a to corresponding terminals 48"—48a" of switch 46 through leads 148—149a by which they are connected through limit switches 49—49a in series with the solenoid coils 41a and 42a of switches 41 and 42, respectively. The springs 41b and 42b normally hold switches 41 and 42 open until closed by the energizing of either of the solenoid coils 41a or 42a. Switches 49—49a are mechanically-tripped limit switches which are set to limit the maximum swing of the rudder (not shown).

Control bar 10 (Fig. 1) is electrically connected by lead 50 to a terminal 50" of switch 46 through which it is connected to one line of the supply main as shown. The second solenoid coil 14 on the electromagnet 12 is connected in series with a branch 50a of lead 50 to the other line of the supply main. A double push button switch 51 is connected in the solenoid coil 14 circuit.

A hand control 53 for manually controlling the steering motor 31 is provided. The hand control, as illustrated in Fig. 1 consists of the three contacts 54, 55 and 56 connected to corresponding terminals 54', 55' and 56' of switch 46. A manually operable lever 57 is common to contact 55 and can be shifted to connect contact 55 to either contacts 56 or 54. It can thus be seen that when switch 46 is in the "up" or hand control position, actuation of the hand control lever 57 to close contact 55 with either 56 or 54 will close either solenoid switch 41 or 42 thereby actuating and controlling the rotation of the steering motor 31.

The operation of the automatic pilot in conjunction with the steering mechanism is as follows:

The steering motor is mechanically coupled to the steering rudder (not shown) of the ship or aircraft and the automatic pilot shown in Figs. 2 and 3 is mounted by means of the mount 24 coincident with the fore and aft line of the ship or plane with the conducting arms 19—19a, the electromagnet 12 and the control bar 10 aligned on the fore and aft line. The bowl 1 is maintained level because of its free suspension in the support 24 by the gimbal 5 and the knife edges 3—3a. To put the automatic pilot into operation, switch 46 (Fig. 1) is in open position. The double push button switch 51 is manually closed, thereby energizing solenoid coil 14, which creates the necessary flux in solenoid core 12 to hold the control bar 10 centered between the conducting arms 19—19a. The ship can now be turned to a desired course manually, and the control bar 10 will be centered in a neutral position spaced from arms 19—19a. The double push button switch 51 is now released, deenergizing the solenoid coil 14, and switch 46 is closed to down position, whereby the automatic pilot will maintain the ship in the set course by actuating the steering motor controls 41—42 in response to course deviations, in the following manner.

Should the ship momentarily change course, the inertia member of buoyant float 6 (Figs. 2 and 3) will rotate relative to the bowl 1, the latter turning with the rotation of the ship. This will cause the control bar 10 to contact either one of the arms 19—19a through corresponding contacts 18 or 18a depending on the direction in which the ship is turned. Assuming the ship has turned to the right with reference to the fore and aft line, Fig. 1, the control bar 10 will contact arm 19 and an electrical continuous circuit will be established between the supply main, lead 50, control bar 10, contact 18, arm 19 and lead 48, energizing solenoid 41a and closing switch 41. When switch 41 is closed, the armature 31 of the steering motor is connected across the supply main through leads 44—45 and 44a—45a, thereby causing it to rotate and apply the necessary amount of rudder to turn the ship back into the set course. At the same time, solenoid coil 13 on electromagnet 12 is energized through leads 43—43a setting up a magnetic field which attracts the control bar 10 back into a centrally aligned position spaced between conducting arms 19—19a as the ship swings back into a position corresponding with its set course, thereby interrupting the circuit, stopping the steering engine, and, in turn deenergizing the solenoid coil 13. Similarly, should the ship swing to the left, arm 19a would make electrical contact with the control arm 10, and an electrical circuit would be set up through lead 48a, energizing the solenoid operated switch 42 through coil 42a, and operating the steering engine armature 31 in an opposite direction to that previously described, thereby turning the ship back to its course. At the same time the solenoid core 12 is again energized by coil 13 through leads 43—43a again to center the control bar 10 as previously described, thereby discontinuing the circuit. By such intermittent action of the control bar 10, in response to course deviations, the automatic pilot maintains the ship on a steady course.

The stability of the float 6 and conducting bar 10 can be utilized to maintain a plane in substantially level flight, as well as in course according to the modification illustrated in Figs. 4 and 5 of the drawings. In this modification a level flight control is attached to the aft portion of the pilot in alignment with the fore and aft line of the plane as shown in Figs. 4 and 5. A bracket 60 is secured to the mount 24 by the screws 61. A pair of insulated brackets 62 and 63 are slidably mounted on the bracket 60 and a pair of conducting arms 65 and 65a are secured to these brackets by screws 69. The arms 65—65a project over the face of the bowl 1 and an electrical contact 66 is provided at the extremity of each arm. Secured to the control arm 10 and in electrical contact therewith is an offset contactor arm 67, a portion of which projects into the gap between conducting arms 65—65a, which are arranged in vertical alignment with and spaced from the contactor 67. A pair of electrical contacts 68—68 are provided on opposite faces of the contactor 67 for making electrical contact with the contacts 66 on the arms 65 and 65a.

The electrical conducting arms 65 and 65a, as well as the control bar 10 are connected to portions of an electrical circuit (not shown) which controls the operation of the elevator mechanism on the plane. The pilot mechanism illustrated in Figs. 4 and 5 of the drawings is mounted in the fore and aft line of the plane opposite the course control electrical contacts, previously described. Assuming the plane has been levelled off at a specified altitude, any tilting of the plane from such path of level flight would result in either one of the arms 65 or 65a making electrical contact with contactor 67. Thus, if the plane were to nose down, arm 65 would meet contactor 67 and thereby close the necessary electrical circuit (not shown) to operate the plane elevates to restore the plane to a level keel. Similarly should the plane nose upwards arm 65a, contacting the contactor 67 would effect the controls necessary to operate the elevators in a reverse direction to thereby restore the plane to its original level path of flight.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An automatic pilot for dirigible craft comprising a support secured in the fore and aft line of said craft, an inertia member freely suspended in said support and including a low-magnetic-retentivity element, electrical contact means on said element, electrical conducting means suspended from said support independently of said inertia member and spaced therefrom, electrical circuit means connecting said contact and said conducting means to a steering control means on said craft, said electrical conducting means being movable relative to said contact means upon deviation of said craft from its course, said relative motion causing said conducting means to engage said contact means to close said circuit and thereby actuate said steering control, and means cooperable with said element for disengaging said contact means when said craft is returned to on course condition.

2. A pilot for automatically maintaining a ship or aircraft on course comprising, a support secured on the fore and aft line of said ship or aircraft, an inertia member freely suspended in said support, a control bar of permeable, low magnetic retentivity material mounted on said inertia member, electrical contact means on said control bar, an electromagnet and a plurality of electrical conducting means freely suspended in said support independently of said inertia member, said electromagnet being in alignment with said control bar, said electrical conducting means being in spaced relation from said contact means, electrical circuit means interconnecting said contact means and said conducting means to steering control means on said ship or aircraft and said electromagnet, said conducting means being movable relative to said contact means upon deviation of said ship or aircraft from its course, said relative movement causing said conducting means to engage said contact means to close said circuit and thereby actuate said steering control and energize said electromagnet whereby it attracts said conducting bar from its contact position into spaced relation from said conducting means.

3. A pilot for automatically controlling the steering mechanism of a ship or aircraft comprising, a support secured on a fore and aft line of the ship or aircraft, an inertia member freely suspended from said support with respect to pitch, roll and rotation of said ship or aircraft, a control bar of permeable, low magnetic retentivity material secured to said inertia member, electrical contact means on said control bar, an electromagnet and a plurality of electrical conducting means freely suspended from said support with respect to pitch and roll of said ship or aircraft but being fixed to rotate therewith, said electromagnet being normally in alignment with said control bar and said conducting means straddling said contact means on said control bar on opposite sides of said fore and aft line and being spaced therefrom, electrical circuit means interconnecting said contact and said conducting means with said steering mechanism and with said electromagnet, deviation of said ship or aircraft from its course causing corresponding movement of said conducting means relative to said contact means whereby one of said conducting means contacts said contact means to actuate said steering mechanism and thereby compensate for said course deviation.

4. A pilot for automatically maintaining aircraft having electrically actuated elevation control means in level flight comprising, a support secured on a fore and aft line of said aircraft, an inertia member freely suspended from said support with respect to pitch, roll and rotation of said aircraft, a control bar of permeable, low magnetic retentivity material secured to said inertia member, electrical contact means on said control bar, a plurality of electrical conducting means secured to support in alignment with the fore and aft line of said aircraft straddling said electrical contact means and being in vertical spaced alignment therewith, whereby tilting of said aircraft from its path of level flight results in movement of one of said conducting means relative to said contact means to contact the latter.

5. The pilot as defined in claim 4, further characterized by means responsive to disappearance of the tilting of said aircraft from level flight and cooperable with said control bar to break the contact between said one conducting means and said contact means.

6. An automatic pilot comprising a support, a bowl freely suspended in said support and being fixed to rotate therewith, an inertia member in said bowl, floatation means antifrictionally supporting said inertia means in said bowl, means interlocking said inertia means and said floatation means, a control bar of permeable, low magnetic retentitivity material secured to said inertia member, electrical contact means on said control bar, a plurality of electrical conducting arms secured to said bowl and straddling said contact means in lateral spaced alignment therewith, rotation of said bowl in any direction causing movement of said conducting arms relative to said electrical contacts and into contact therewith.

7. Apparatus for automatically controlling the steering of dirigible craft, said apparatus comprising an elongated conductive member having contact means at the ends thereof, said member being supported on the craft for substantially free motion with at least three degrees of freedom relative to the craft, and responsive normally to gravitational forces only, said contact means being simultaneously responsive to relative motion of said member and said craft in a direction having components in two mutually perpendicular senses, and electric circuit means between said member and the steering mechanism of the craft, said circuit means including switch means actuatable in response to deviation of the craft from a desired on course condition for causing said steering mechanism to minimize the deviation.

JARLY C. MALEN.

REFERENCES CITED

The following references are of record in the file of this patent:

UNITED STATES PATENTS

| Number | Name | Date |
|---|---|---|
| 1,015,837 | Regnard | Jan. 30, 1912 |
| 1,026,415 | Thompson | May 14, 1912 |
| 1,203,219 | Macy | Oct. 31, 1916 |
| 1,507,504 | Morgan | Sept. 2, 1924 |
| 2,067,441 | Freeman | Jan. 12, 1937 |
| 2,068,065 | Neubert | Jan. 19, 1937 |
| 2,112,504 | Mirfield | Mar. 29, 1938 |

Certificate of Correction

April 18, 1950

Patent No. 2,504,139

JARLY C. MALEN

It is hereby certified that errors appear in the printed specification of the above numbered patent requiring correction as follows:

Column 2, line 1, for the word "is", first occurrence, read *it*; line 42, for "yawning" read *yawing*; column 3, lines 42 and 43, strike out "leads 148–149a by" and insert the same before "limit" in line 44, same column; column 6, line 59, before "support" insert *said*;

and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*